(12) United States Patent
Holmes et al.

(10) Patent No.: US 9,481,236 B2
(45) Date of Patent: Nov. 1, 2016

(54) POWERTRAIN FOR A VEHICLE

(71) Applicant: GM GLOBAL TECHNOLOGY OPERATIONS LLC, Detroit, MI (US)

(72) Inventors: Alan G. Holmes, Clarkston, MI (US); Michael G. Reynolds, Troy, MI (US); Alexandru Rajala, Farmington Hills, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 277 days.

(21) Appl. No.: 14/208,461

(22) Filed: Mar. 13, 2014

(65) Prior Publication Data

US 2015/0258882 A1    Sep. 17, 2015

(51) Int. Cl.
 *B60K 6/20*    (2007.10)
 *B60K 6/485*    (2007.10)
(52) U.S. Cl.
 CPC ............ *B60K 6/485* (2013.01); *Y02T 10/6226* (2013.01); *Y10S 903/909* (2013.01)
(58) Field of Classification Search
 CPC ....... B60K 6/20; F02N 11/04; F02N 15/043; F02N 15/06; F02N 15/067; F02N 15/08; F16H 7/02
 USPC .......................... 23/179.25, 123.28; 903/906
 See application file for complete search history.

(56) References Cited

U.S. PATENT DOCUMENTS

| | | | |
|---|---|---|---|
| 1,234,676 A | * | 7/1917 | Langner .............. B60R 16/0235 123/179.28 |
| 1,585,831 A | * | 5/1926 | Bradford ............. B60R 16/0235 290/46 |
| 5,418,400 A | * | 5/1995 | Stockton ................. F02N 11/04 290/22 |
| 6,213,829 B1 | | 4/2001 | Takahashi et al. |

(Continued)

FOREIGN PATENT DOCUMENTS

| CN | 1186158 A | 7/1998 |
|---|---|---|
| CN | 101044316 A | 9/2007 |

(Continued)

OTHER PUBLICATIONS

Kenji Itagaki, Tatsuo Terantani, Kohjiro Kuramochi, Seiji Nakamura, Takeshi Tachibana, Hatsuo Nakao, Yusuke Kamijo; SAE Technical Paper Series 2002-01-0990 entitled "Development of the Toyota Mild-Hybrid System (THS-M)"; SAE 2002 World Congress, Detroit, Michigan, US; Mar. 4-7, 2002; 10 pages.

*Primary Examiner* — Hieu T Vo
*Assistant Examiner* — Arnold Castro
(74) *Attorney, Agent, or Firm* — Quinn Law Group, PLLC (57) ABSTRACT

A powertrain is disclosed. A ring gear is attached to a first distal end of a crankshaft such that the ring gear and the crankshaft are rotatable in unison about a longitudinal axis. A motor-generator includes a motor/generator shaft rotatable about a first axis spaced from the longitudinal axis. A starter mechanism includes a first starter gear coupleable to the motor/generator shaft and rotatable about a second axis spaced from the longitudinal axis. The first and second axes are spaced and substantially parallel to each other. The first starter gear is movable along the second axis between a first position engaging the ring gear such that torque is transferred from the motor/generator shaft through the first starter gear and the ring gear to the crankshaft to start the engine, and a second position disengaged from the ring gear to rotatably disconnect the starter mechanism from the ring gear.

20 Claims, 4 Drawing Sheets

(56) References Cited

U.S. PATENT DOCUMENTS

| | | | |
|---|---|---|---|
| 8,251,035 B2* | 8/2012 | Hirano | F02N 11/0844 |
| | | | 123/179.28 |
| 8,251,164 B2* | 8/2012 | McGee | F02N 15/02 |
| | | | 180/65.21 |
| 8,606,450 B2 | 12/2013 | Holmes et al. | |
| 2002/0123401 A1 | 9/2002 | Henry | |
| 2003/0102173 A1 | 6/2003 | Koelle et al. | |
| 2004/0261753 A1* | 12/2004 | Garabello | F02B 63/04 |
| | | | 123/179.28 |
| 2005/0022770 A1 | 2/2005 | Yumiyama et al. | |
| 2007/0107544 A1 | 5/2007 | Hirabayashi | |
| 2007/0199533 A1 | 8/2007 | Takahashi | |
| 2008/0149405 A1 | 6/2008 | Hladun et al. | |
| 2009/0200095 A1 | 8/2009 | Kawasaki | |
| 2009/0255741 A1 | 10/2009 | Major et al. | |
| 2010/0144487 A1 | 6/2010 | Noboru et al. | |
| 2010/0296949 A1 | 11/2010 | Corley | |
| 2012/0017863 A1* | 1/2012 | Moriya | F02N 11/0855 |
| | | | 123/179.1 |
| 2012/0068651 A1 | 3/2012 | Stief | |
| 2012/0275078 A1 | 11/2012 | Kokubun et al. | |
| 2013/0066492 A1 | 3/2013 | Holmes et al. | |
| 2013/0099507 A1 | 4/2013 | Moriya et al. | |
| 2013/0104828 A1 | 5/2013 | Moriya et al. | |
| 2014/0001768 A1 | 1/2014 | Moriya et al. | |
| 2014/0100729 A1 | 4/2014 | Jung | |
| 2014/0102253 A1* | 4/2014 | Benz | F02B 67/06 |
| | | | 74/7 C |
| 2014/0137701 A1 | 5/2014 | Benz et al. | |
| 2015/0096518 A1 | 4/2015 | Creviston et al. | |
| 2015/0258882 A1 | 9/2015 | Holmes et al. | |
| 2015/0258984 A1* | 9/2015 | Atluri | B60W 10/06 |
| | | | 701/22 |
| 2015/0314777 A1 | 11/2015 | Koike et al. | |

FOREIGN PATENT DOCUMENTS

| | | |
|---|---|---|
| DE | 19854948 A1 | 5/2000 |
| EP | 1079103 A2 | 2/2001 |
| GB | 111039 A | 11/1917 |

* cited by examiner

Fig-16

POWERTRAIN FOR A VEHICLE

TECHNICAL FIELD

The present disclosure relates to a powertrain for a vehicle.

BACKGROUND

A vehicle can include an internal combustion engine coupled to a transmission and a final drive to rotate wheels that move the vehicle. To start the engine of a non-hybrid vehicle, a starter motor can be energized which causes a crankshaft of the engine to turn and start the engine.

A hybrid electric vehicle utilizes both an electric motor-generator and an internal combustion engine to offer reduced fuel consumption and emissions. One type of hybrid electric vehicle utilizes a belted-alternator-starter (BAS). The BAS utilizes a motor-generator coupled to a crankshaft of the engine usually by a belt and pulley system. The motor-generator can restart the engine when a brake is released at a stop light and the motor-generator can be rotated by the engine during regenerative braking. This type of hybrid vehicle utilizes a starter motor independent of the motor-generator to start the engine when the engine has been shut off for an extended period of time. The starter motor and the motor-generator operate separately, i.e., not coupleable to each other.

Another hybrid electric vehicle utilizes a motor-generator coupled to a crankshaft of the internal combustion engine by a planetary gear and clutch system. The crankshaft rotates about an axis and the motor-generator is disposed coaxial with the axis. The planetary gear and clutch system includes a planetary gear set disposed coaxial with the axis and is incorporated into the motor-generator to start the engine when the engine has been shut off for an extended period of time.

Yet another hybrid electric vehicle utilizes a motor-generator coupled to a crankshaft of the internal combustion engine by a belt and pulley system. The system includes a crankshaft pulley coupled to the crankshaft and a motor-generator pulley coupled to a shaft of the motor-generator, with a belt disposed about the pulleys to transfer torque between the crankshaft and the shaft of the motor-generator. The system can further include a planetary gear set and a pair of clutches, with the planetary gear set and clutches either coupled to the crankshaft pulley of the crankshaft or coupled to the shaft of the motor-generator. The crankshaft and the crankshaft pulley are rotatable about a first axis and the shaft of the motor-generator and the motor-generator pulley are rotatable about a second axis spaced from the first axis. Generally, actuation of either of the clutches couples the crankshaft and the shaft of the motor-generator together through the belt. When the planetary gear set and the clutches are coupled to the crankshaft pulley, the planetary gear set and the clutches are coaxial with the first axis of the crankshaft pulley, and when the planetary gear set and the clutches are coupled to the shaft of the motor-generator, the planetary gear set and the clutches are coaxial with the second axis of the shaft of the motor-generator. One clutch operates to rotatably couple the crankshaft and the shaft of the motor-generator together through the belt at a ratio relative to the sizes of the crankshaft pulley and the motor-generator pulley. The other clutch operates to rotatably couple the crankshaft and the shaft of the motor-generator together though both the belt and the planetary gear set, at a ratio relative to the sizes of the crankshaft pulley and the motor-generator pulley, as well as the ratio through the planetary gear set, i.e., these ratios are multiplied together. Therefore, all torque flows through the belt in this belt and pulley system. This type of hybrid vehicle can either start the engine utilizing only the belt and pulley system or utilizing a starter motor independent of the motor-generator. When utilizing the separate starter motor, the starter motor and the motor-generator operate separately, i.e., not coupleable to each other.

SUMMARY

The present disclosure provides a powertrain for a vehicle. The powertrain includes an engine, and the engine includes a housing and a crankshaft at least partially disposed inside the housing. The crankshaft is rotatable about a longitudinal axis. The powertrain also includes a ring gear attached to a first distal end of the crankshaft such that the ring gear and the crankshaft are rotatable in unison about the longitudinal axis. Additionally, the powertrain includes a motor-generator and a starter mechanism. The motor-generator includes a motor/generator shaft being rotatable about a first axis. The first axis is spaced from the longitudinal axis. The starter mechanism includes a first starter gear coupleable to the motor/generator shaft. The first starter gear is rotatable about a second axis, with the second axis being spaced from the longitudinal axis. Furthermore, the first and second axes are spaced from and substantially parallel to each other. The first starter gear is movable along the second axis between a first position engaging the ring gear such that torque is transferred from the motor/generator shaft through the first starter gear and the ring gear to the crankshaft to start the engine, and a second position disengaged from the ring gear to rotatably disconnect the starter mechanism from the ring gear.

In addition, the present disclosure provides another powertrain for a vehicle. The powertrain includes an engine, and the engine includes a housing and a crankshaft at least partially disposed inside the housing. The crankshaft is rotatable about a longitudinal axis. The powertrain also includes a ring gear disposed outside of the housing. The ring gear is attached to a first distal end of the crankshaft such that the ring gear and the crankshaft are rotatable in unison about the longitudinal axis. The powertrain further includes a crankshaft pulley disposed outside of the housing. The crankshaft pulley is coupleable to a second distal end of the crankshaft such that the crankshaft pulley and the crankshaft are rotatable in unison about the longitudinal axis. Additionally, the powertrain includes a motor-generator operable in a first mode to start the engine and a second mode after the engine is started. The motor-generator includes a motor/generator shaft and a motor/generator pulley coupleable to the motor/generator shaft adjacent to a first end of the motor-generator. The motor/generator shaft extends out of a second end of the motor-generator. The motor/generator pulley and the motor/generator shaft are each rotatable about a first axis and the first axis is spaced from the longitudinal axis. The powertrain further includes an endless rotatable device disposed about the crankshaft pulley and the motor/generator pulley to selectively rotate the motor/generator pulley when the motor-generator is in the second mode to selectively transfer torque between the crankshaft and the motor/generator shaft. Furthermore, the powertrain includes a starter mechanism, with the starter mechanism including a first starter gear coupleable to the motor/generator shaft. The first starter gear is rotatable about a second axis when the motor-generator is in the first mode.

The second axis is spaced from the longitudinal axis, and the first and second axes are spaced from and substantially parallel to each other. The first starter gear is movable along the second axis between a first position engaging the ring gear such that torque is transferred from the motor/generator shaft through the first starter gear and the ring gear to the crankshaft to start the engine, and a second position disengaged from the ring gear after the engine is started to rotatably disconnect the starter mechanism from the ring gear.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Referring to the Figures, wherein like numerals indicate like or corresponding parts throughout the several views, a plurality of embodiments of a powertrain 20A, 20B, 20C, 20D, 20E for a vehicle are generally shown. The vehicle that can utilize the powertrain 20A, 20B, 20C, 20D, 20E can be an automotive vehicle, such as, a car, a truck, etc. It is to be appreciated that the vehicle can alternatively be a non-automotive vehicle, such as, a farm vehicle, a marine vehicle, an aviation vehicle, etc. Furthermore, the vehicle can be a hybrid vehicle utilizing the powertrain 20A, 20B, 20C, 20D, 20E disclosed herein. It is to be appreciated that the vehicle can be any other suitable vehicle that can utilize the powertrain 20A, 20B, 20C, 20D, 20E disclosed herein.

Generally, the powertrain 20A, 20B, 20C, 20D, 20E for each of the embodiments herein can include an engine 22, a transmission and a final drive coupleable to each other to rotate wheels of the vehicle to propel the vehicle. The engine 22 can include an output member 24 or crankshaft 24 which is coupleable to an input member of the transmission. The transmission can include a gearing arrangement and one or more clutches through which torque is transferred from the output member 24 of the engine 22 to the input member of the transmission, then to the final drive and out to the wheels to move the vehicle. The wheels can be front wheels or rear wheels of the vehicle. The front and/or the rear wheels can be powered by the powertrain 20A, 20B, 20C, 20D, 20E.

The powertrain 20A, 20B, 20C, 20D, 20E of each of the embodiments (shown in FIGS. 1-10) includes the engine 22 as discussed above and can include an electromechanical apparatus coupleable to the engine 22. For example, the engine 22 can be an internal combustion engine. The engine 22 includes a housing 26 and the crankshaft 24 at least partially disposed inside the housing 26. The crankshaft 24 is rotatable about a longitudinal axis 28. In the Figures, the crankshaft 24 is shown schematically without any specific features for illustrative purposes only and it is to be appreciated that the crankshaft 24 can have various configurations to cooperate with other components of the engine 22. The engine 22 can also include a cylinder block, one or more connecting rods, pistons, valves, etc., which will not be discussed further. It is to be appreciated that the engine 22 can be designed to operate on gasoline or diesel fuel, etc. Furthermore, the electromechanical apparatus includes various components, some of which are discussed below.

Continuing with FIGS. 1-10, the powertrain 20A, 20B, 20C, 20D, 20E of each of the embodiments also includes a ring gear 30. In certain embodiments, the ring gear 30 is disposed outside of the housing 26 of the engine 22. The ring gear 30 is attached to a first distal end 32 of the crankshaft 24 such that the ring gear 30 and the crankshaft 24 are rotatable in unison about the longitudinal axis 28. Simply stated, the ring gear 30 and the crankshaft 24 can rotate as a unit about the longitudinal axis 28.

Additionally, the powertrain 20A, 20B, 20C, 20D, 20E of each of the embodiments (see FIGS. 1-10) can include a second rotatable element 34, such as a crankshaft pulley 34, which is rotatable about the longitudinal axis 28. In certain embodiments, the crankshaft pulley 34 is disposed outside of the housing 26 of the engine 22. The crankshaft pulley 34 is coupleable to a second distal end 36 of the crankshaft 24 such that the crankshaft pulley 34 and the crankshaft 24 can be rotatable in unison about the longitudinal axis 28. Specifically, coupleable can include when the crankshaft pulley 34 is directly coupled to the crankshaft 24 or indirectly coupled to the crankshaft 24 by the operation of another mechanism, such as clutching, as discussed further below. Generally, the first and second distal ends 32, 36 of the crankshaft 24 are spaced from each other along the longitudinal axis 28. It is to be appreciated that one or more bearings can rotatably support the crankshaft 24. It is to also be appreciated that the second rotatable element 34 can be a sprocket, etc., instead of a pulley.

Furthermore, the powertrain 20A, 20B, 20C, 20D, 20E of each of the embodiments (see FIGS. 1-10) includes a motor-generator 38. Simply stated, the motor-generator 38 can operate as a motor or as a generator. The powertrain 20A, 20B, 20C, 20D, 20E can be referred to as a hybrid powertrain because the powertrain 20A, 20B, 20C, 20D, 20E utilizes the motor-generator 38 which can assist in reducing fuel consumption and emissions of the vehicle. For example, the motor-generator 38 can be utilized as a motor to start the engine 22 (utilizing gears discussed below) or as a torque assist which provides torque to the crankshaft 24 to assist in propelling the vehicle when the vehicle is moving (utilizing an endless rotatable device 62 discussed below). As another example, the motor-generator 38 can be utilized as a generator to generate electricity or recharge an energy storage device 40, such as a battery. When the motor-generator 38 is generating electricity, the electricity can drive various auxiliary devices of the vehicle.

One suitable motor-generator 38 is a brushless electric motor-generator. Additionally, the motor-generator 38 can be an alternating current (AC) motor-generator or any other suitable motor-generator. For example, torque being outputted from the AC motor-generator 38 can be from about 15.0 newton meter (Nm) to about 25.0 Nm. As another example, the torque being outputted from the AC motor-generator 38 can be from about 15.0 Nm to about 20.0 Nm. It is to be appreciated that the torque being outputted from the motor-generator 38 can be values other than identified above. The motor-generator 38 provides reduced maximum torque requirement (as compared, for example, to a BAS as discussed in the background section), which allows the mass size of the motor-generator 38 to be decreased and also allows reduced power requirements of the motor-generator 38. Therefore, utilizing the motor-generator 38, as described above, can reduce costs.

The motor-generator 38 can be coupled to the outside of the housing 26 of the engine 22 and/or supported by any suitable component adjacent to the engine 22. The motor-generator 38 can be supported by any suitable methods, such as fasteners, brackets, braces, etc. The motor-generator 38 is operable in a first mode to start the engine 22 and a second mode after the engine 22 is started. For example, the first mode occurs when the engine 22 has been shut off, i.e., either for an extended period of time or a short period of time. The short period of time can be when the engine 22 has been shut off at a stop (such as a stop light, etc.), while the ignition of the vehicle remains on. The extended period of time can be when the engine 22 has been shut off overnight or when the ignition has been turned off for any period of time, etc. The second mode occurs when the motor-generator 38 is operating as the torque assist, regenerative braking, generating electricity or recharging the energy storage device 40, while the ignition of the vehicle remains on.

The motor-generator 38 includes a motor/generator shaft 42 being rotatable about a first axis 44. In certain operations, when the motor/generator shaft 42 rotates, torque can be transferred to the crankshaft 24 as discussed further below. Furthermore, the motor/generator shaft 42 does not move along the first axis 44. As best shown in FIGS. 2, 4, 6, 8 and 9, the first axis 44 is spaced from the longitudinal axis 28. In certain embodiments, the first axis 44 and the longitudinal axis 28 are spaced from each other and substantially parallel to each other. Therefore, the motor/generator shaft 42 and the crankshaft 24 are offset from each other. It is to be appreciated that the motor/generator shaft 42 can be split into more than one piece, e.g., more than one piece to accommodate the operation of one or more clutches, etc.

The motor-generator 38 can include a first rotatable element 46, such as a motor/generator pulley 46, which is rotatable about the first axis 44. The first rotatable element 46 is coupleable to the motor/generator shaft 42. More specifically, the motor/generator pulley 46 is coupleable to the motor/generator shaft 42 adjacent to a first end 48 of the motor-generator 38. Coupleable can include when the motor/generator pulley 46 is directly coupled to the motor/generator shaft 42 or indirectly coupled to the motor/generator shaft 42 by the operation of another mechanism, such as clutching, as discussed further below. For certain operations, the motor/generator shaft 42 and the motor/generator pulley 46 can rotate in unison about the first axis 44. In other operations, the motor/generator shaft 42 and the motor/generator pulley 46 are not rotatable in unison, i.e., rotatable separately or one rotatable while the other remains stationary (does not rotate).

The motor/generator shaft 42 can extend out of a second end 50 of the motor-generator 38. Generally, the first and second ends 48, 50 of the motor-generator 38 are spaced from each other along the first axis 44. Specifically, the motor-generator 38 can include a housing having the first and second ends 48, 50. Therefore, the motor/generator shaft 42 is at least partially disposed inside the housing of the motor-generator 38. It is to be appreciated that one or more bearings can rotatably support the motor/generator shaft 42. It is to also be appreciated that the first rotatable element 46 can be a sprocket, etc., instead of a pulley.

Figure 11:
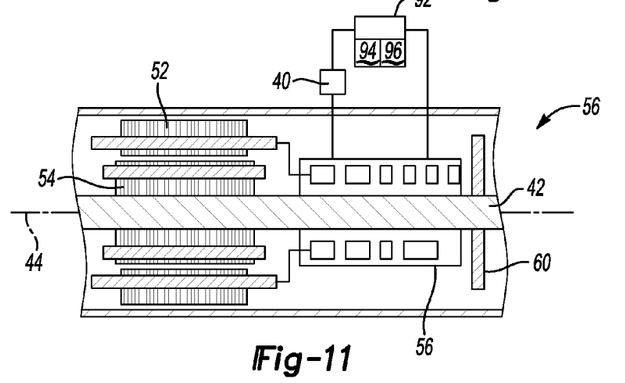
FIG. 11 is a schematic fragmentary cross-sectional view of a motor-generator for FIGS. 1-10.

Referring to FIG. 11, the motor-generator 38 of each of these powertrain embodiments 20A, 20B, 20C, 20D, 20E can include a stator 52 and a rotor 54 spaced from the stator 52. The rotor 54 is attached to the motor/generator shaft 42 such that the rotor 54 and the motor/generator shaft 42 are rotatable in unison about the first axis 44 relative to the stator 52. Simply stated, the rotor 54 and the motor/generator shaft 42 are rotatable as a unit about the first axis 44 while the stator 52 remains stationary. The stator 52 is in electrical communication with the energy storage device 40. For example, when the motor-generator 38 is functioning as the motor, power stored in the energy storage device 40 can be supplied to the stator 52/rotor 54 to cause rotation of the rotor 54 and ultimately start the engine 22. As another example, when the motor-generator 38 is functioning as the generator, torque from the rotor 54 rotating about the first axis 44 is converted into electrical power which can be stored in the energy storage device 40 for later use.

Referring to FIGS. 1, 3, 5, 7, 10 and 11, the motor-generator 38 of each of these embodiments can also include an electrical device 56. For example, the electrical device 56 can include an integrated power inverter that converts direct current provided by the energy storage device 40 to alternating current to power the motor-generator 38 to function as the motor. Furthermore, the integrated power inverter can convert alternating current to direct current to be stored in the energy storage device 40 when the motor-generator 38 functions as the generator. Therefore, the integrated power inverter can be in electrical communication with the stator 52 to operate the motor-generator 38 as the motor or as the generator. The electrical device 56 can include one or more sensors (such as for example, a motor position sensor that detects the position of the motor/generator shaft 42), controllers, fans 60 (see FIG. 11) to cool the electrical device 56, etc.

Turning to FIGS. 1-10, each of the embodiments of the powertrain 20A, 20B, 20C, 20D, 20E can further include an endless rotatable device 62, i.e., a device having no ends, disposed about the crankshaft pulley 34 and the motor/generator pulley 46 to selectively transfer torque between the crankshaft 24 and the motor/generator shaft 42. In other words, the endless rotatable device 62 is disposed about the first and second rotatable elements 46, 34 to selectively transfer torque between the first and second rotatable elements 46, 34. Specifically, the endless rotatable device 62 is disposed about the crankshaft pulley 34 and the motor/generator pulley 46 to selectively rotate the motor/generator pulley 46 when the motor-generator 38 is in the second mode to transfer torque between the crankshaft 24 and the motor/generator shaft 42. For example, rotation of the motor/generator pulley 46 by the endless rotatable device 62 can, in certain operations, correspondingly rotate the motor/generator shaft 42.

In certain embodiments, the endless rotatable device 62 is a belt. The belt can be a ribbed belt, a flat belt or any other suitable configuration. Therefore, the motor-generator 38 can be coupled to the crankshaft 24 of the engine 22 by the endless rotatable device 62 and the pulleys 34, 46. In certain embodiments, the endless rotatable device 62 can be a chain instead of the belt, and sprockets can be utilized with the chain instead of the pulleys 34, 36.

The powertrain 20A, 20B, 20C, 20D, 20E of each of the embodiments (see FIGS. 1, 3, 5, 7 and 10) also includes a starter mechanism 64. The starter mechanism 64 can be coupled to the outside of the housing 26 of the engine 22 and/or supported by any suitable component adjacent to the engine 22. The starter mechanism 64 can be supported by any suitable methods, such as fasteners, brackets, braces, etc.

Generally, the starter mechanism 64 and the motor-generator 38 are coupleable to each other. The starter mechanism 64 can operate to start the engine 22 by utilizing the motor-generator 38. Specifically, the motor-generator 38 and the starter mechanism 64 cooperate to start the engine 22 when the motor-generator 38 is in the first mode. When the motor-generator 38 operates in the second mode, the starter mechanism 64 does not operate.

The starter mechanism 64 and the motor-generator 38 are coupleable to each other through, for example, various shaft(s) and/or selective and/or continuous engagement of gear(s) to start the engine 22 when the engine 22 has been shut off for any period of time, i.e., short or long. Therefore, coupleable can include selective coupling of various components and/or continuous coupling of various components. When the motor-generator 38 is in the first mode, the starter mechanism 64 cooperates with the motor-generator 38 to start the engine 22 whether the engine 22 has been shut off at a stop or overnight. The starter mechanism 64 and the motor-generator 38 are coupleable to each other in different configurations (each of these embodiments are discussed further below). The motor-generator 38 and the starter mechanism 64 are coupleable to each other, such as by shafts/gears, to provide reliable starting of the engine 22 in all weather conditions (such as during wet, icy and/or cold conditions, etc.) while minimizing noise or slip of the endless rotatable device 62 by minimizing high torque levels from the load applied to the endless rotatable device 62 during starting of the engine 22. Furthermore, the motor-generator 38 and the starter mechanism 64 are coupleable to each other, such as by shafts/gears, to allow the motor-generator 38 to have different ratios for starting and restarting the engine 22 (utilizes the gears) as compared to generating and torque assist (utilizes the rotatable elements). For example, the during starting of the engine 22, the ratio between the motor/generator shaft 42 and the crankshaft 24 can be 6:1 or higher, while the ratio between the motor/generator shaft 42 and the crankshaft 24 during generating electricity after the engine 22 has been started can be 4:1 or lower (such as 3:1, etc.). In certain embodiments, the starter mechanism 64 and the motor-generator 38 can be actuated one after the other, i.e., actuated in tandem, to start the engine 22. For all of the embodiments herein, actuating the starter mechanism 64 and the motor-generator 38 in tandem can avoid a tooth-butt situation as discussed further below for various embodiments.

As best shown in FIGS. 1, 3, 5, 7 and 10, the starter mechanism 64 includes a first gear 66, also referred to as a first starter gear 66 coupleable to the motor/generator shaft 42. The first starter gear 66 can be coupleable to the motor/generator shaft 42 through engagement of various gears and/or shafts, as discussed below for each of the embodiments. Furthermore, the first starter gear 66 is rotatable about a second axis 68. Generally, the second axis 68 is spaced from the longitudinal axis 28. Specifically, the first starter gear 66 is rotatable about the second axis 68 when the motor-generator 38 is in the first mode. In other words, when the engine 22 is to be started while in the first mode, the first starter gear 66 moves into engagement with the ring gear 30 to rotate the ring gear 30 and the crankshaft 24 to start the engine 22. After the engine 22 is started, the first starter gear 66 moves away from the ring gear 30 such that the first starter gear 66 disengages the ring gear 30 while the crankshaft 24 continues to rotate. The first starter gear 66 is movable along the second axis 68 between a first position engaging the ring gear 30 such that torque is transferred from the motor/generator shaft 42 through the first starter gear 66 and the ring gear 30 to the crankshaft 24 to start the engine 22, and a second position disengaged from the ring gear 30 to rotatably disconnect the starter mechanism 64 from the ring gear 30. The second position disengaged from the ring gear 30 can be after the engine 22 is started to rotatably disconnect the starter mechanism 64 from the ring gear 30. The first position of the first starter gear 66 is best shown in FIGS. 1, 3, 5, 7 and 10. The second position of the first starter gear 66 is shown in FIGS. 12-16. The first starter gear 66 and the ring gear 30 are selectively geared to each other to provide starting of the engine 22 in all weather conditions (such as during wet, icy and/or cold conditions, etc.) while keeping the cost of these components down.

Referring to FIGS. 12-16, the starter mechanism 64 can include at least one linear actuator 70 to move the first starter gear 66 to one of the first and second positions. For the embodiments of FIG. 12, a plurality of linear actuators 70 can be utilized. The linear actuator 70 can be selectively energized to move the first starter gear 66 along the second axis 68. The linear actuator 70 can be various configurations, and non-limiting examples can include a solenoid, an electric motor driving a ball-screw mechanism, a shape-memory alloy actuator, an electro-active polymer actuator, etc. For the shape-memory alloy actuator, selectively energizing the material, such as the alloy, can change the shape of the material which causes the first starter gear 66 to move along the second axis 68. For the electro-active polymer actuator, selectively energizing the material, such as the polymer, can change the shape of the material to move the first starter gear 66 along the second axis 68.

The operation of the linear actuator 70 is detailed below utilizing the solenoid example. Generally, the solenoid can be utilized to move the first starter gear 66 along the second axis 68 to one of the first and second positions. The solenoid can be disposed inside, outside or partially outside of the starter mechanism 64, or can be in any other suitable location. The solenoid can include a coil 71 selectively magnetized and a core 73 attracted to the coil 71 when the coil 71 is magnetized. When the core 73 is coupled to the first starter gear 66, the core 73 is selectively attracted to the coil 71. When the core 73 is attracted to the coil 71, the first starter gear 66 moves into engagement with the ring gear 30. Therefore, the coil 71 remains stationary while the core 73 is selectively movable. It is to be appreciated that the solenoid can be other configurations than discussed above. For example, the coil 71 can be concentric or eccentric about the second axis 68, or the coil 71 can be disposed at one side. The core 73 can be formed of a ferromagnetic material or any other suitable material that can be attracted to the coil 71 when the coil 71 is magnetized.

Furthermore, the starter mechanism 64 can include at least one return mechanism 72 to move the first starter gear 66 back to one of the first and second positions. For example, when the solenoid is energized, the first starter gear 66 can move to the first position to engage the ring gear 30, and when the solenoid is de-energized, the return mechanism 72 can move the first starter gear 66 to the second position.

The return mechanism 72 can include a biasing member 74 to bias the first starter gear 66 back to one of the first and second positions. The biasing member 74 can be a coil spring or any other suitable biasing member to move the first starter gear 66. It is to be appreciated that one or more shoulders 76 can be coupled to the first starter gear 66 and the inside of the starter mechanism 64 to provide reaction surfaces for the biasing member 74 to move the first starter gear 66 back to one of the first and second positions. It is to also be appreciated that the return mechanism 72 can alternatively be electronically actuated.

Furthermore, each of the powertrain embodiments 20A, 20B, 20C, 20D, 20E can include a first clutch 78 coupleable to one of the motor/generator pulley 46 and the crankshaft pulley 34. For illustrative purposes only, the first clutch 78 is shown coupled to the motor/generator pulley 46 in FIGS. 1-8 and the first clutch 78 is shown coupled to the crankshaft pulley 34 in FIGS. 9 and 10. The first clutch 78 is optional in the embodiments of FIGS. 1-8 when the crankshaft 24 and the motor/generator shaft 42 have the same rotational speed. In other words, the first clutch 78 is optional when the ratio of the gears produce the same rotational speed between the crankshaft 24 and the motor/generator shaft 42 that the ratio of the pulleys would produce between the crankshaft 24 and the motor/generator shaft 42, or vice versa. When the first clutch 78 is coupled to the motor/generator pulley 46, the first clutch 78 selectively disconnects rotation between the motor/generator pulley 46 and the motor/generator shaft 42. When the first clutch 78 is coupled to the crankshaft pulley 34, the first clutch 78 selectively disconnects rotation between the crankshaft pulley 34 and the crankshaft 24. It is to be appreciated that the first clutch 78 can include a plurality of plates, etc. When the first clutch 78 is coupleable to the motor/generator pulley 46, the motor/generator pulley 46 is selectively coupled to the motor/generator shaft 42 through operation of the first clutch 78. Similarly, when the first clutch 78 is coupleable to the crankshaft pulley 34, the crankshaft pulley 34 is selectively coupled to the crankshaft 24 through operation of the first clutch 78.

Figure 9:
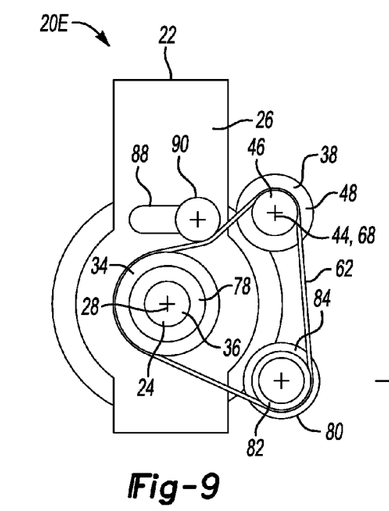
FIG. 9 is a schematic end view of a powertrain of a fifth embodiment.
Figure 10:
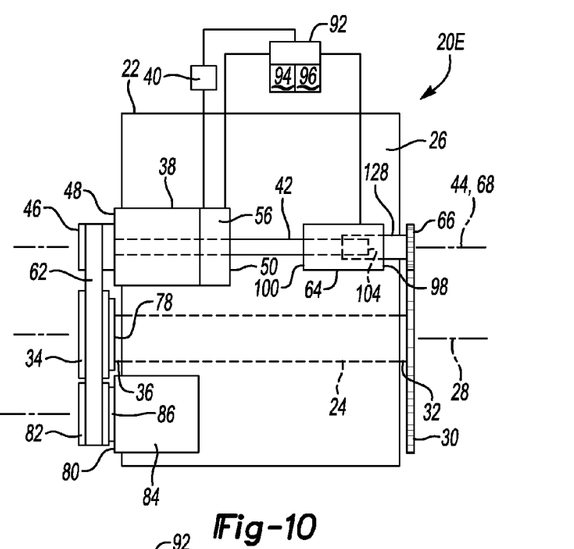
FIG. 10 is a schematic side view of the powertrain of FIG. 9.

As shown in FIGS. 9 and 10, an air conditioning device 80 can be coupleable to the endless rotatable device 62. The air conditioning device 80 can include a first pulley 82, with the endless rotatable device 62 being disposed about the crankshaft pulley 34, the motor/generator pulley 46 and the first pulley 82. Therefore, the motor-generator 38 and the air conditioning device 80 can be coupled to each other by the endless rotatable device 62 and the pulleys 34, 46, 82. For example, rotation of the first pulley 82 by the endless rotatable device 62 can correspondingly rotate a shaft inside the air conditioning device 80 to operate the air conditioning device 80. The air conditioning device 80 operates to supply cool air into a passenger compartment of the vehicle. The air conditioning device 80 can include a compressor 84 and other components not specifically discussed herein. It is to be appreciated that the air conditioning device 80 is one example, and other auxiliary devices, such as a coolant pump, etc., can be coupleable to the endless rotatable device 62.

When the first clutch 78 is coupled to the crankshaft pulley 34, the first clutch 78 can be operable to selectively disconnect rotation of the crankshaft 24 and the crankshaft pulley 34 which allows the air conditioning device 80 to function while the engine 22 is shut off. Therefore, when the engine 22 is off, the motor-generator 38 can operate as the motor to rotate the endless rotatable device 62 and rotate the first pulley 82 to run the air conditioning device 80 to cool the passenger compartment without rotating the crankshaft 24. As such, the motor-generator 38 can operate in a third mode when the engine 22 remains off to operate various auxiliary devices such as the air conditioning device 80, the coolant pump, etc. It is to be appreciated that the motor-generator 38 operates in the third mode when the ignition of the vehicle is on while the engine 22 is shut off.

Continuing with FIGS. 9 and 10, the air conditioning device 80 can include a clutch 86 coupleable to the first pulley 82 of the air conditioning device 80. The clutch 86 can selectively disconnect the first pulley 82 and the shaft of the air conditioning device 80 depending on whether the air conditioning device 80 is to be operated. Even though the air conditioning device 80 is only shown for the powertrain embodiment 20E of FIGS. 9 and 10, the air conditioning device 80 can be utilized in any of the other embodiments of the powertrain 20A, 20B, 20C, 20D herein and can be orientated/configured substantially the same as shown in FIGS. 9 and 10. As mentioned above, the first clutch 78 can disconnect the crankshaft pulley 34 to prevent rotation of the crankshaft 24 while the air conditioning device 80 is being operated by the motor-generator 38 when the engine 22 is off. It is to be appreciated that the air conditioning device 80 is optional for the embodiments herein. It is to also be appreciated that the clutch 86 of the air conditioning device 80 can include a plurality of plates, etc.

As shown in FIG. 9, a tensioner mechanism 88 can engage the endless rotatable device 62 to apply a first force thereto to tension the endless rotatable device 62. The tensioner mechanism 88 can include an engagement member 90 selectively engaging the endless rotatable device 62. The engagement member 90 is movable, for example, back and forth, to optionally adjust the tension on the endless rotatable device 62. The engagement member 90 can optionally increase or decrease the amount of tension applied to the endless rotatable device 62. Furthermore, the engagement member 90 can optionally be disengaged from the endless rotatable device 62 when desired. For example, when the engagement member 90 does not contact the endless rotatable device 62, the endless rotatable device 62 can rotatably connect the crankshaft pulley 34, the motor/generator pulley 46 and/or the first pulley 82 during starting of the engine 22, e.g., transfers torque, or the endless rotatable device 62 can slip such that the endless rotatable device 62 does not rotatably connect the crankshaft pulley 34, the motor/generator pulley 46 and/or the first pulley 82 during starting of the engine 22, e.g., does not transfer torque. Therefore, the tensioner mechanism 88 can act as a clutch when the endless rotatable device 62 can slip, as such, the first clutch 78 can be eliminated when the tensioner mechanism 88 is utilized to selectively transfer torque between the motor/generator shaft 42 and the crankshaft 24. The tensioner mechanism 88 can be a variable actuator or any other suitable actuator or mechanism to adjust the tension applied to the endless rotatable device 62. The tension applied to the endless rotatable device 62 can be adjusted based on the engine operating conditions or the vehicle operating conditions.

Additionally, it is to be appreciated that a plurality of tensioner mechanisms 88 can be utilized and can function as discussed above. For example, the tensioner mechanisms 88 can be utilized to engage the endless rotatable device 62, with one tensioner mechanism 88 selectively applying the first force to the endless rotatable device 62 and another tensioner mechanism 88 selectively applying a second force to the endless rotatable device 62. The first and second forces can be different or substantially the same. Even though the tensioner mechanism 88 is only shown for the powertrain embodiment 20E of FIGS. 9 and 10, the tensioner mechanism(s) 88 can be utilized in any of the other embodiments of the powertrain 20A, 20B, 20C, 20D herein and can be orientated/configured substantially the same as shown in FIG. 9. It is to be appreciated that the tensioner mechanism(s) 88 can include other components not specifically discussed herein. It is to also be appreciated that the tensioner mechanism(s) 88 are optional for all of the embodiments herein.

When a user desires to start the engine 22 of the vehicle, a key-on event occurs, such as turning a key in the ignition or pushing a button, etc. This key-on event causes a main controller 92 to communicate to the starter mechanism 64 and the motor-generator 38 to prepare to start the engine 22. The main controller 92 can communicate with the electrical device 56 of the motor-generator 38 to operate in one of the first and second modes. To start the engine 22, the motor-generator 38 operates in the first mode as the motor to rotate the motor/generator shaft 42 and thus rotate the first starter gear 66 to transfer torque. As such, the starter mechanism 64 does not have a motor, and rotation of the first starter gear 66 is provided by the motor-generator 38 when starting the engine 22. Power or current from the energy storage device 40 is delivered to the motor-generator 38 to operate as the motor to start the engine 22.

Furthermore, the main controller 92 communicates with the starter mechanism 64 to move the first starter gear 66 along the second axis 68 into engagement with the ring gear 30 to start the engine 22. Specifically, the main controller 92 signals the starter mechanism 64 to energize the linear actuator 70 which causes the first starter gear 66 to correspondingly move into engagement with the ring gear 30 to start the engine 22. Therefore, when the motor/generator shaft 42 rotates, this rotation will cause the first starter gear 66 to rotate which will cause the ring gear 30 to rotate when the first starter gear 66 engages the ring gear 30. The rotation of the ring gear 30 causes the crankshaft 24 to rotate to start the engine 22. Simply stated, the motor/generator shaft 42 transfers torque through the first starter gear 66 and the ring gear 30 to the crankshaft 24 to start the engine 22.

Once the engine 22 is started, the main controller 92 communicates with the starter mechanism 64 to move the first starter gear 66 along the second axis 68 away from the ring gear 30 such that the first starter gear 66 and the ring gear 30 disengage from each other. Specifically, the main controller 92 signals the starter mechanism 64 to de-energize the linear actuator 70 which allows the return mechanism 72 to move the first starter gear 66 along the second axis 68 away from the ring gear 30. Once the engine 22 is started, the crankshaft 24 can continue to rotate without assistance from the starter mechanism 64/the motor-generator 38.

The main controller 92 can be part of an electronic control module that is in communication with various components of the vehicle. The main controller 92 includes a processor 94 and a memory 96 on which is recorded instructions for communicating with the motor-generator 38, the starter mechanism 64 and/or auxiliary devices such as the air conditioning device 80, the coolant pump, etc. The main controller 92 is configured to execute the instructions from the memory 96, via the processor 94. For example, the main controller 92 can be a host machine or distributed system, e.g., a computer such as a digital computer or microcomputer, acting as a vehicle control module, and/or as a proportional-integral-derivative (PID) controller device having a processor, and, as the memory 96, tangible, non-transitory computer-readable memory such as read-only memory (ROM) or flash memory. The main controller 92 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the main controller 92 can include all software, hardware, memory 96, algorithms, connections, sensors, etc., necessary to monitor and control the motor-generator 38, the starter mechanism 64 and/or the auxiliary devices such as the air conditioning device 80, etc. As such, a control method can be embodied as software or firmware associated with the main controller 92. It is to be appreciated that the main controller 92 can also include any device capable of analyzing data from various sensors, comparing data, making the necessary decisions required to control and monitor the motor-generator 38, the starter mechanism 64 and/or the air conditioning device 80, etc.

Figure 1:
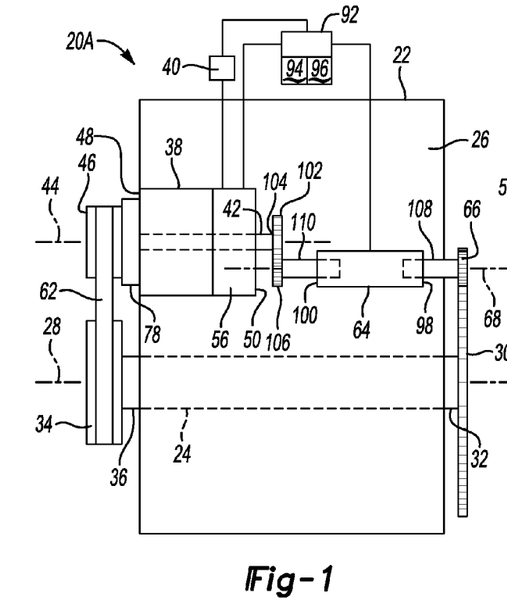
FIG. 1 is a schematic side view of a powertrain of a first embodiment.
Figure 2:
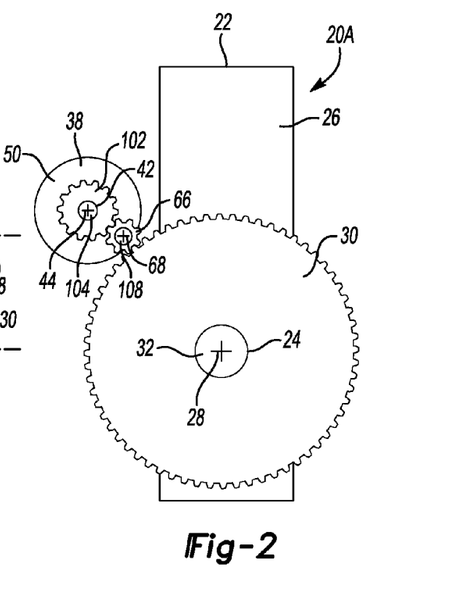
FIG. 2 is a schematic end view of the powertrain of FIG. 1.
Figure 3:
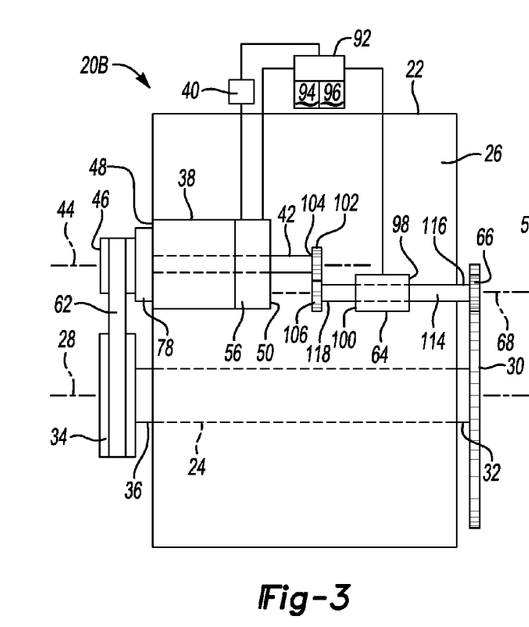
FIG. 3 is a schematic side view of a powertrain of a second embodiment.
Figure 4:
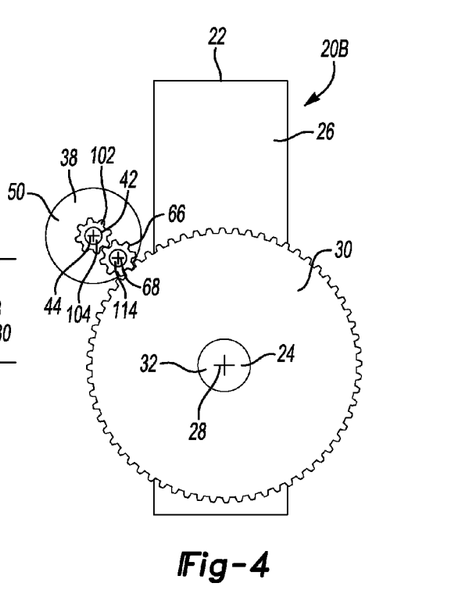
FIG. 4 is a schematic end view of the powertrain of FIG. 3.
Figure 5:
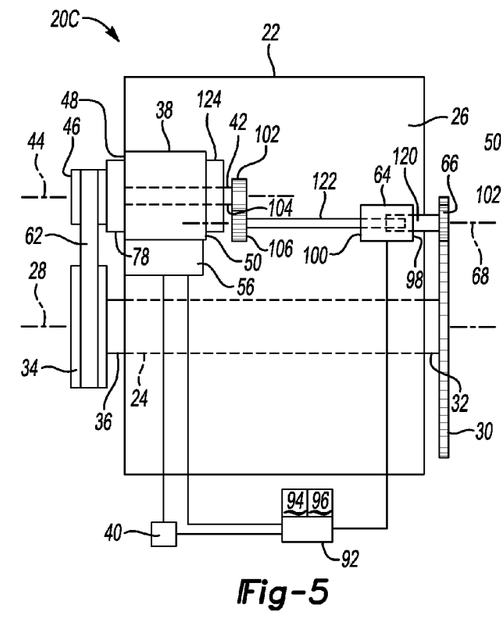
FIG. 5 is a schematic side view of a powertrain of a third embodiment.
Figure 6:
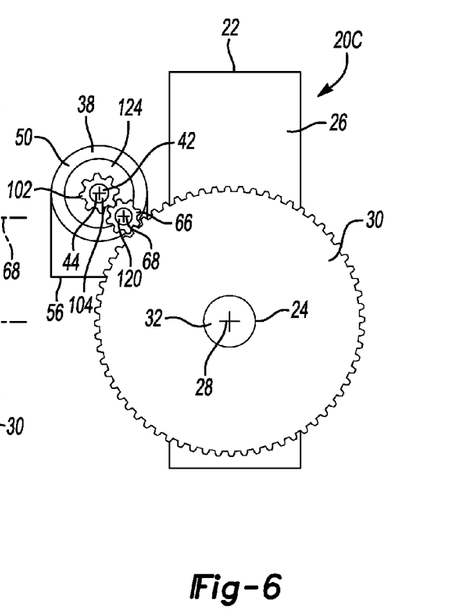
FIG. 6 is a schematic end view of the powertrain of FIG. 5.

Referring to the powertrain embodiments 20A, 20B, 20C as shown in FIGS. 1-6, the starter mechanism 64 can include a first end 98 and a second end 100 spaced from each other along the second axis 68. Specifically, the starter mechanism 64 can include a housing having the first and second ends 98, 100. The first starter gear 66 can be disposed adjacent to the first end 98 of the starter mechanism 64. The motor/generator shaft 42 is coupleable to the starter mechanism 64 adjacent to the second end 100 of the starter mechanism 64. Furthermore, in these embodiments, the motor-generator 38 can include a motor/generator gear 102 attached to a distal end 104 of the motor/generator shaft 42 such that the motor/generator gear 102 and the motor/generator shaft 42 are rotatable in unison about the first axis 44. In other words, the motor/generator gear 102 and the motor/generator shaft 42 can rotate as a unit about the first axis 44. The motor/generator gear 102 is disposed adjacent to the second end 50 of the motor-generator 38 and the motor/generator pulley 46 is disposed adjacent to the first end 48 of the motor-generator 38. Therefore, the motor/generator gear 102 and the motor/generator pulley 46 are disposed at opposite ends of the motor-generator 38. Additionally, in these embodiments, the starter mechanism 64 can include a second gear 106, also referred to as a second starter gear 106, coupleable to the motor/generator gear 102. As best shown in FIGS. 2, 4 and 6, the first and second axes 44, 68 are spaced from and substantially parallel to each other.

Turning to the powertrain embodiments 20A, 20B of FIGS. 1-4, the second starter gear 106 is movable along the second axis 68 between a third position engaging the motor/generator gear 102 such that torque is transferred from the motor/generator shaft 42 through the motor/generator gear 102 and the second starter gear 106, and a fourth position disengaged from the motor/generator gear 102 to rotatably disconnect the starter mechanism 64 from the motor-generator 38. Therefore, when in the fourth position, torque is not transferred between the motor-generator 38 and the starter mechanism 64 to the crankshaft 24. Generally, when the first starter gear 66 moves to the first position, the second starter gear 106 moves to the third position. Similarly, when the first starter gear 66 moves to the second position, the second starter gear 106 moves to the fourth position. The third position of the second starter gear 106 is best shown in FIGS. 1 and 3. The fourth position of the second starter gear 106 is shown in FIGS. 2 and 4.

Figure 12:
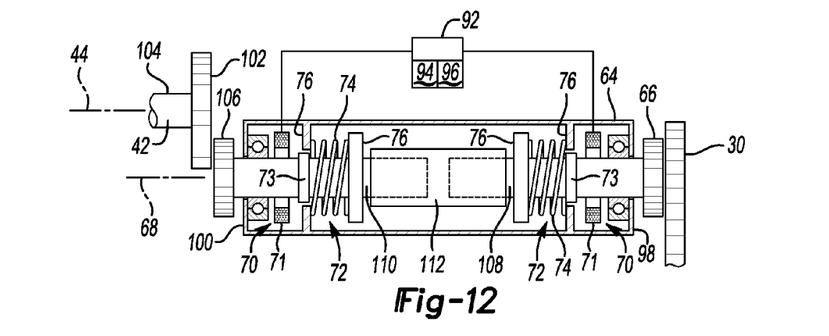
FIG. 12 is a schematic partial cross-sectional view of a starter mechanism for the embodiment of FIGS. 1 and 2.

With specific reference to the powertrain embodiment 20A of FIGS. 1, 2 and 12, the starter mechanism 64 can include a first shaft 108 having the first starter gear 66 attached thereto. In this embodiment, the first shaft 108 and the first starter gear 66 are rotatable in unison about the second axis 68. Additionally, in this embodiment, the first shaft 108 and the first starter gear 66 are movable along the second axis 68 in unison between the first and second positions. In other words, the first shaft 108 and the first starter gear 66 can rotate about and move along the second axis 68 as a unit. Furthermore, the motor/generator shaft 42 and the first shaft 108 are offset from each other (see FIG. 1). It is to be appreciated that one or more bearings can rotatably support the first shaft 108.

Continuing with the powertrain embodiment 20A of FIGS. 1, 2 and 12, the starter mechanism 64 can include a second shaft 110 having the second starter gear 106 attached thereto. In this embodiment, the second shaft 110 and the second starter gear 106 are rotatable in unison about the second axis 68. Additionally, in this embodiment, the second shaft 110 and the second starter gear 106 are movable along the second axis 68 in unison between the third and fourth positions. In other words, the second shaft 110 and the second starter gear 106 can rotate about and move along the second axis 68 as a unit. The first and second shafts 108, 110 each extend outwardly from the starter mechanism 64. More specifically, the first shaft 108 extends outwardly from the first end 98 of the starter mechanism 64 and the second shaft 110 extends outwardly from the second end 100 of the starter mechanism 64. The first and second starter gears 66, 106 can move along the second axis 68 in opposite directions, and thus, the first and second shafts 108, 110 can correspondingly move in opposite directions. The first and second shafts 108, 110, the first and second starter gears 66, 106, the motor/generator shaft 42 and the motor/generator gear 102 concurrently rotate with each other when the first starter gear 66 is in the first position and the second starter gear 106 is in the third position to transfer torque from the motor/generator shaft 42 through the first and second starter gears 66, 106 and the ring gear 30 to the crankshaft 24 to start the engine 22. As best shown in FIG. 1, the motor/generator shaft 42 and the second shaft 110 are offset from each other, while the first and second shafts 108, 110 are spaced from each other along the second axis 68. In other words, the first and second shafts 108, 110 are concentric along the second axis 68.

In this embodiment, a plurality of solenoids and a plurality of return mechanisms 72 can be utilized as shown in FIG. 12, with one core 73 and one shoulder 76 attached to the first shaft 108, and another core 73 and another shoulder 76 attached to the second shaft 110. Therefore, the core 73 and the shoulder 76 attached to the first shaft 108 are movable simultaneously and the core 73 and the shoulder 76 attached to the second shaft 110 are movable simultaneously.

Furthermore, in this powertrain embodiment 20A (FIGS. 1, 2 and 12), the starter mechanism 64 can include an intermediate shaft 112 coupled to the first and second shafts 108, 110 between the first and second starter gears 66, 106 such that the intermediate shaft 112 can rotatably couple the first and second shafts 108, 110 together. In other words, the first and second shafts 108, 110 remain in engagement with the intermediate shaft 112 when the first and second shafts 108, 110 move back and forth along the second axis 68. The intermediate shaft 112 can be any suitable configuration to allow the first and second shafts 108, 110 to move along the second axis 68 while also rotatably coupling the first and second shafts 108, 110 together. For example, the first and second shafts 108, 110 can move along the second axis 68 inside the intermediate shaft 112 and these shafts 108, 110, 112 can be splined or be any other suitable configuration to cooperate with each other. It is to be appreciated that one or more bearings can rotatably support the second shaft 110 and/or the intermediate shaft 112.

In the embodiment of FIGS. 1, 2 and 12, one of the first and second starter gears 66, 106 can move along the second axis 68 to respective first and third positions before the other one of the first and second starter gears 66, 106 moves along the second axis 68 to the other one of the respective first and third positions. In other words, the first and second starter gears 66, 106 can move in tandem. Therefore, for example, the first starter gear 66 can move to the first position before the second starter gear 106 moves to the third position, and alternatively, the second starter gear 106 can move to the third position before the first starter gear 66 moves to the first position. As another example, the first starter gear 66 can move to the second position before the second starter gear 106 moves to the fourth position, and alternatively, the second starter gear 106 can move to the fourth position before the first starter gear 66 moves to the second position.

As the motor/generator shaft 42 begins to rotate, i.e., very slow rotation of the motor/generator shaft 42, to start the engine 22, the second starter gear 106 can then move into engagement with the motor/generator gear 102 during the very slow rotation of the motor/generator shaft 42 which can avoid a tooth-butt situation where the teeth of respective gears 102, 106 initial align to abut each other (instead of meshing together). The same concept applies to the first starter gear 66. As such, tandem movement of the first and second starter gears 66, 106 can prevent the tooth-butt situation discussed above.

Furthermore, in the embodiment of FIGS. 1, 2 and 12, instead of one of the first and second starter gears 66, 106 moving before the other one of the first and second starter gears 66, 106, the first and second starter gears 66, 106 can move simultaneously between respective positions. Therefore, the first starter gear 66 can move to the first position and the second starter gear 106 can move to the third position simultaneously. As another example, the first starter gear 66 can move to the second position and the second starter gear 106 can move to the fourth position simultaneously.

Figure 13:
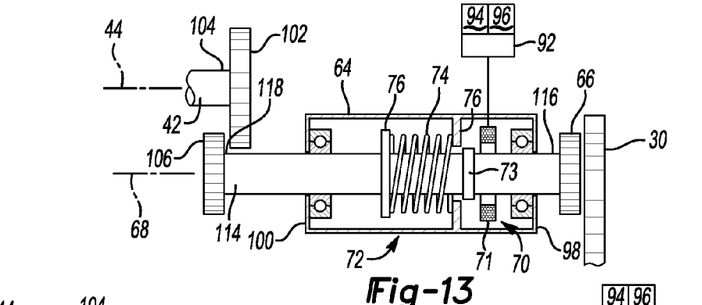
FIG. 13 is a schematic partial cross-sectional view of a starter mechanism for the embodiment of FIGS. 3 and 4.

With specific reference to the powertrain embodiment 20B of FIGS. 3, 4 and 13, the starter mechanism 64 can include an elongated shaft 114 extending through the starter mechanism 64 along the second axis 68. The elongated shaft 114 has a first end portion 116 disposed outside of the first end 98 of the starter mechanism 64 and a second end portion 118 disposed outside of the second end 100 of the starter mechanism 64. The first starter gear 66 is attached to the first end portion 116 and the second starter gear 106 is attached to the second end portion 118. In this embodiment, the motor/generator shaft 42 and the elongated shaft 114 are offset from each other. Furthermore, in this embodiment, one solenoid and one return mechanism 72 can be utilized as shown in FIG. 13, with one core 73 and one shoulder 76 attached to the elongated shaft 114. Therefore, the core 73 and the shoulder 76 attached to the elongated shaft 114 are movable simultaneously.

Generally, the first gear 66 is attached to the first end portion 116 and the second gear 106 is attached to the second end portion 118 such that movement of the elongated shaft 114 along the second axis 68 simultaneously moves the first and second gears 66, 106 into and out of engagement with the ring gear 30 and the motor/generator gear 102 respectively. Movement of the elongated shaft 114 along the second axis 68 simultaneously moves the first starter gear 66 to one of the first and second positions and the second starter gear 106 to the respective third and fourth positions. For example, when the elongated shaft 114 moves in one direction along the second axis 68, the first starter gear 66 simultaneously moves to the first position and the second starter gear 106 simultaneously moves to the third position in the same direction. As another example, when the elongated shaft 114 moves in the opposite direction along the second axis 68, the first starter gear 66 simultaneously moves to the second position and the second starter gear 106 simultaneously moves to the fourth position in the same direction. Additionally, the first and second starter gears 66, 106 and the elongated shaft 114 are rotatable about the second axis 68 in unison. Simply stated, the first and second starter gears 66, 106 and the elongated shaft 114 are rotatable about and movable along the second axis 68 as a unit. The second starter gear 106 engages the motor/generator gear 102 when in the third position to rotatably connect the motor/generator shaft 42 and the elongated shaft 114 to ultimately start the engine 22. Therefore, the elongated shaft 114, the first and second starter gears 66, 106, the motor/generator shaft 42 and the motor/generator gear 102 concurrently rotate with each other when the first starter gear 66 is in the first position and the second starter gear 106 is in the third position to transfer torque from the motor/generator shaft 42 through the first and second starter gears 66, 106 and the ring gear 30 to the crankshaft 24 to start the engine 22. The second starter gear 106 disengages the motor/generator gear 102 when in the fourth position to rotatably disconnect the motor/generator shaft 42 and the elongated shaft 114 to ultimately disconnect the motor-generator 38 and the starter mechanism 64. It is to be appreciated that one or more of the gears 30, 66, 102, 106 can be arranged/configured to allow tandem engagement of the first and second starter gears 66, 106 to avoid the tooth-butt situation discussed above. It is to also be appreciated that one or more bearings can rotatably support the elongated shaft 114.

Figure 14:
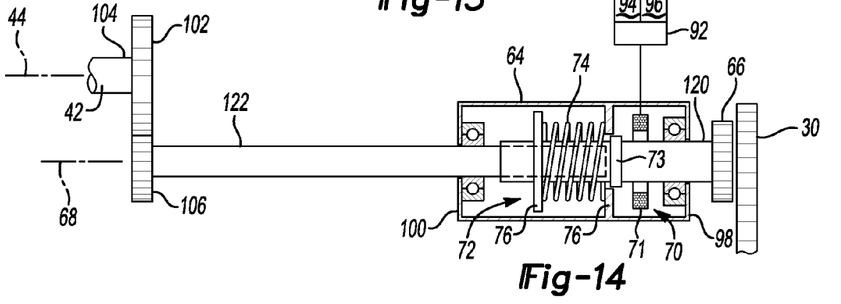
FIG. 14 is a schematic partial cross-sectional view of a starter mechanism for the embodiment of FIGS. 5 and 6.

Turning to the powertrain embodiment 20C of FIGS. 5, 6 and 14, the starter mechanism 64 can include a first shaft 120 having the first starter gear 66 attached thereto. In this embodiment, the first shaft 120 and the first starter gear 66 are rotatable in unison about the second axis 68. Additionally, in this embodiment, the first shaft 120 and the first starter gear 66 are movable along the second axis 68 in unison between the first and second positions. Simply stated, the first starter gear 66 and the first shaft 120 are rotatable about and movable along the second axis 68 as a unit. As best shown in FIG. 5, the motor/generator shaft 42 and the first shaft 120 are offset from each other. Furthermore, in this embodiment, one solenoid and one return mechanism 72 can be utilized as shown in FIG. 14, with one core 73 and one shoulder 76 attached to the first shaft 120. Therefore, the core 73 and the shoulder 76 attached to the first shaft 120 are movable simultaneously.

Continuing with the embodiment of FIGS. 5, 6 and 14, the starter mechanism 64 can include a second shaft 122 having the second starter gear 106 attached thereto. In this embodiment, the second shaft 122 and the second starter gear 106 are rotatable in unison about the second axis 68. Therefore, the second starter gear 106 and the second shaft 122 are rotatable about the second axis 68 as a unit. Furthermore, in this embodiment, the second starter gear 106 remains in engagement with the motor/generator gear 102 when the first starter gear 66 is in the first and second positions. Simply stated, the second starter gear 106 is in continuous engagement with the motor/generator gear 102. As such, the first starter gear 66 can move along the second axis 68 independently of the second shaft 122 and the second starter gear 106.

Again, continuing with the embodiment of FIGS. 5, 6, and 14, the first and second shafts 120, 122 each extend outwardly from the starter mechanism 64. More specifically, the first shaft 120 extends outwardly from the first end 98 of the starter mechanism 64 and the second shaft 122 extends outwardly from the second end 100 of the starter mechanism 64. Furthermore, the first and second shafts 120, 122 are concentric along the second axis 68. The first and second shafts 120, 122 remain in engagement with each other as the first shaft 120 moves between the first and second positions. For example, the first and second shafts 120, 122 can be splined to each other or be any other suitable configuration to cooperate with each other. The motor/generator shaft 42 and the second shaft 122 are also offset from each other (see FIG. 5). The first and second shafts 120, 122, the first and second starter gears 66, 106, the motor/generator shaft 42 and the motor/generator gear 102 concurrently rotate with each other when the first starter gear 66 is in the first position to transfer torque from the motor/generator shaft 42 through the first and second starter gears 66, 106 and the ring gear 30 to the crankshaft 24 to start the engine 22. The first starter gear 66 disengages the ring gear 30 when in the second position to rotatably disconnect the starter mechanism 64 and the ring gear 30, i.e., does not transfer torque to crankshaft 24. It is to be appreciated that one or more bearings can rotatably support the first and/or second shafts 120, 122.

Continuing with the embodiment of FIGS. 5, 6 and 14, the powertrain 20C can optionally include the first clutch 78 coupleable to the motor/generator pulley 46 as discussed above. Furthermore, the powertrain 20C of this embodiment can include a second clutch 124 spaced from the first clutch 78. Specifically, the first clutch 78 can be disposed adjacent to the first end 48 of the motor-generator 38 and the second clutch 124 can be disposed adjacent to the second end 50 of the motor-generator 38. The second clutch 124 is coupleable to the motor/generator shaft 42 to selectively disconnect rotation of the motor/generator gear 102 from the motor/generator pulley 46 such that the motor/generator gear 102 and the second starter gear 106 remain stationary when the second clutch 124 is actuated. More specifically, the motor/generator gear 102, the second shaft 122, the second starter gear 106, the first shaft 120 and the first starter gear 66 do not rotate when the second clutch 124 disconnects the motor/generator gear 102 from the motor/generator shaft 42 and the motor/generator pulley 46. It is to be appreciated that the motor/generator shaft 42 can be split into more than one piece to operate with the first and/or second clutches 78, 124. When the second clutch 124 is coupleable to the motor/generator shaft 42, the motor/generator gear 102 is selectively coupled to the motor/generator shaft 42 through operation of the second clutch 124.

Figure 7:
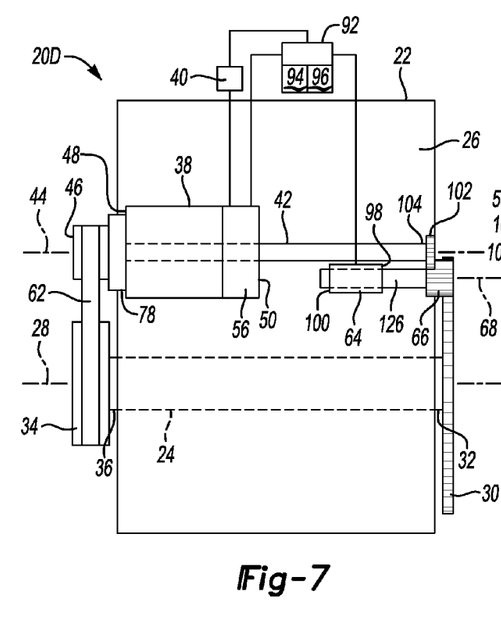
FIG. 7 is a schematic side view of a powertrain of a fourth embodiment.
Figure 8:
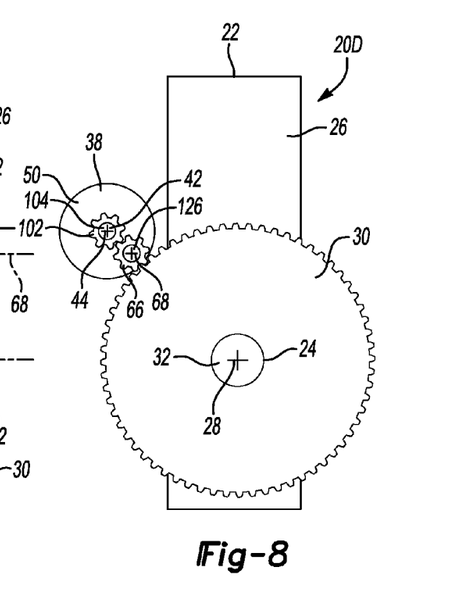
FIG. 8 is a schematic end view of the powertrain of FIG. 7.
Figure 15:
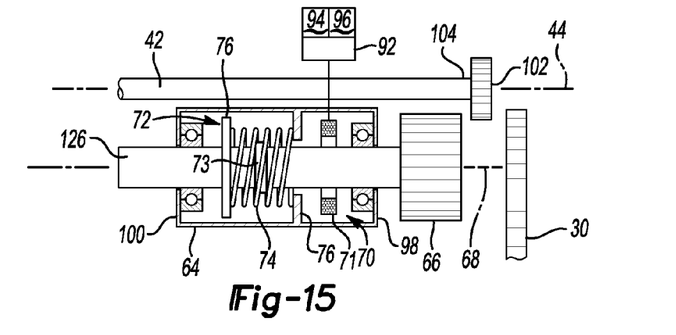
FIG. 15 is a schematic partial cross-sectional view of a starter mechanism for the embodiment of FIGS. 7 and 8.

Turning to the powertrain embodiment 20D of FIGS. 7, 8 and 15, as discussed above, the motor/generator gear 102 is attached to the distal end 104 of the motor/generator shaft 42 such that the motor/generator gear 102 and the motor/generator shaft 42 are rotatable in unison about the first axis 44. In other words, the motor/generator gear 102 and the motor/generator shaft 42 can rotate about the first axis 44 as a unit. Furthermore, the starter mechanism 64 includes a first shaft 126 having the first starter gear 66 attached thereto. The first shaft 126 and the first starter gear 66 are rotatable in unison about the second axis 68. Additionally, in this embodiment, the first shaft 126 and the first starter gear 66 are movable along the second axis 68 in unison between the first and second positions. Simply stated, the first starter gear 66 and the first shaft 126 are rotatable about and movable along the second axis 68 as a unit. Furthermore, in this embodiment, one solenoid and one return mechanism 72 can be utilized as shown in FIG. 15, with one core 73 and one shoulder 76 attached to the first shaft 126. Therefore, the core 73 and the shoulder 76 attached to the first shaft 126 are movable simultaneously.

Continuing with the embodiment of FIGS. 7, 8 and 15, the first gear 66 is movable to engage both the motor/generator gear 102 and the ring gear 30 such that the motor/generator gear 102, the motor/generator shaft 42 and the first gear 66 concurrently rotate with each other to transfer torque from the motor/generator shaft 42 through the first gear 66 and the ring gear 30 to the crankshaft 24 to start the engine 22. Specifically, the first starter gear 66 engages both of the motor/generator gear 102 and the ring gear 30 when in the first position such that the motor/generator gear 102, the motor/generator shaft 42, the first shaft 126 and the first starter gear 66 concurrently rotate with each other when the first starter gear 66 is in the first position to transfer torque from the motor/generator shaft 42 through the first starter gear 66 and the ring gear 30 to the crankshaft 24 to start the engine 22. Furthermore, in this embodiment, the first starter gear 66 disengages from both of the motor/generator gear 102 and the ring gear 30 when in the second position to rotatably disconnect the starter mechanism 64 from the motor-generator 38. Therefore, when in the second position, torque is not transferred between the motor-generator 38 and the starter mechanism 64 to the crankshaft 24. As best shown in FIG. 8, the first and second axes 44, 68 are spaced from and substantially parallel to each other. Therefore, in this embodiment, the motor/generator shaft 42 and the first shaft 126 are offset from each other as best shown in FIG. 7.

Figure 16:
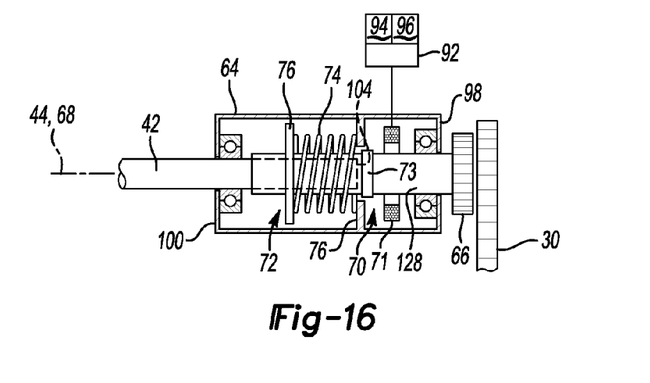
FIG. 16 is a schematic partial cross-sectional view of a starter mechanism for the embodiment of FIGS. 9 and 10.

Referring to the powertrain embodiment 20E of FIGS. 9, 10 and 16, the starter mechanism 64 can include a first shaft 128 having the first starter gear 66 attached thereto. In this embodiment, the first shaft 128 and the first starter gear 66 are rotatable in unison about the second axis 68. Furthermore, in this embodiment, the first shaft 128 and the first starter gear 66 are movable along the second axis 68 in unison between the first and second positions. In other words, the first shaft 128 and the first starter gear 66 can rotate about and move along the second axis 68 as a unit. The motor/generator shaft 42 is coupleable to the first shaft 128 such that the motor/generator shaft 42 rotates in unison with the first shaft 128 when the first starter gear 66 is in the first and second positions. Specifically, the first shaft 128 and the motor/generator shaft 42 are coupled to each other. When the first starter gear 66 is in the first position, the first starter gear 66 engages the ring gear 30 and the motor-generator 38 can transfer torque to the crankshaft 24. When the first starter gear 66 moves to the second position, the first starter gear 66 disengages from the ring gear 30 but continues to be rotatable in unison with the motor/generator shaft 42. When the first starter gear 66 is in the second position, the motor-generator 38 cannot transfer torque to the crankshaft 24. Furthermore, in this embodiment, one solenoid and one return mechanism 72 can be utilized as shown in FIG. 16, with one core 73 and one shoulder 76 attached to the first shaft 128. Therefore, the core 73 and the shoulder 76 attached to the first shaft 128 are movable simultaneously.

Continuing with FIGS. 9, 10 and 16, the first shaft 128 and the motor/generator shaft 42 can be splined to each other or be any other suitable configuration to cooperate with each other. Specifically, the first shaft 128 and the motor/generator shaft 42 are coupled to each, for example, by the splines. In this embodiment, the first and second axes 44, 68 are coaxial. Therefore, the motor/generator shaft 42 and the first shaft 128 are coaxial and thus, the motor/generator gear 102 can be eliminated because the motor/generator shaft 42 and the first shaft 128 engage each other. The first starter gear 66 can move along the second axis 68 independently of the motor/generator shaft 42. The first shaft 128 and the motor/generator shaft 42 remain in engagement with each other as the first shaft 128 moves between the first and second positions. For this embodiment, when starting the engine 22 when the motor-generator 38 is in the first mode, the rotational direction of the motor/generator shaft 42 and the first starter gear 66 will be reversed during the starting of the engine 22 due to the endless rotatable device 62 rotating in the same direction that the crankshaft 24 and the ring gear 30 are rotating. It is to be appreciated that one or more bearings can rotatably support the first shaft 128.

Generally, the powertrain 20A, 20B, 20C, 20D, 20E discussed herein can provide fuel economy. Gearing the motor-generator 38 and the starter mechanism 64 together provides reliable starting of the engine 22 in all weather conditions (such as during wet, icy and/or cold conditions, etc.) while minimizing noise or slip of the endless rotatable device 62 by minimizing high torque levels from the load applied to the endless rotatable device 62 during starting of the engine 22. Furthermore, the motor-generator 38 and the starter mechanism 64 are coupleable together to allow the motor-generator 38 to have different ratios for starting and restarting the engine 22 as compared to generating and torque assist. For example, during the starting of the engine 22, the ratio between the motor/generator shaft 42 and the crankshaft 24 can be 6:1 or higher, while the ratio between the motor/generator shaft 42 and the crankshaft 24 during generating electricity after the engine 22 has been started can be 4:1 or lower (such as 3:1, etc.). By providing a ratio of 6:1 or higher for starting allows the maximum torque requirement for the motor-generator 38 to be reduced which allows the mass size of the motor-generator 38 to be decreased and reduces power requirements of the motor-generator 38. Additionally, starting occurs quickly with the ratios described herein. Furthermore, the first starter gear 66 and the ring gear 30 are geared to each other to provide all weather condition starting of the engine 22 while keeping the cost of these components down. The motor-generator 38 and the starter mechanism 64 as described herein can reduce powertrain complexity and thus reduce costs.

The electromechanical apparatus, as mentioned above, can include the first and second rotatable elements 46, 34, the endless rotatable device 62 and the motor-generator 38. Furthermore, the electromechanical apparatus can include a gear set. The gear set includes the ring gear 30 and the first gear 66 as discussed above. The ring gear 30 and the first gear 66 each have external teeth. Furthermore, the gear set can include other gears for various embodiments. For example, the gear set can include the second gear 106 and the motor/generator gear 102, and these gears 102, 106 also have external teeth being engageable with each other. The motor/generator gear 102 is attached to the motor/generator shaft 42 as discussed above, and the second gear is attached to the second shaft 110, 122 or the elongated shaft 114 as discussed above.

The first gear 66 is attached to a shaft, such as the first shaft 108, 120, 126 or the elongated shaft 114 discussed above. Therefore, the first gear 66 and the shaft 108, 114, 120, 126 are rotatable about the second axis 68 spaced from the longitudinal axis 28. The ring gear 30 is coupleable to the crankshaft 24 to transfer torque to the crankshaft 24 when the external teeth of the first gear 66 engage the external teeth of the ring gear 30 to rotate the ring gear 30.

The electromechanical apparatus also includes a first coupling device and a second coupling device. The first coupling device is operable for selectively transferring torque between the motor/generator shaft 42 and the crankshaft 24 through the endless rotatable device 62 at a first ratio based on the first and second rotatable elements 46, 34. The second coupling device is operable for selectively transferring torque between the motor/generator shaft 42 and the crankshaft 24 through the gear set at a second ratio based on the ring gear 30 and the first gear 66.

The first and second ratios are different from each other. The first ratio is based on the outer diameters of the first rotatable element 46 and the second rotatable element 34. For example, the first ratio can be 4:1 or lower, such as 3:1, 2:1, etc. The second ratio is based on the outer diameters of the gear set, such as the ring gear 30 and the first starter gear 66. For example, the second ratio can be 6:1 or higher, such as 8:1, 10:1, 12:1, 15:1, etc.

The first coupling device can be defined as the first clutch 78 or the tensioner mechanism 88 as discussed above. Briefly, the first clutch 78 can be coupleable to one of the first and second rotatable elements 46, 34. When the tensioner mechanism 88 is the first coupling device, the tensioner mechanism 88 selectively engages the endless rotatable device 62. The second coupling device can be defined as the starter mechanism 64 as discussed above.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A powertrain for a vehicle, the powertrain comprising:
   an engine including a crankshaft being rotatable about a longitudinal axis;
   a ring gear attached to a first distal end of the crankshaft such that the ring gear and the crankshaft are rotatable in unison about the longitudinal axis;
   a motor-generator operable as a motor and operable as a generator, and wherein the motor-generator includes a motor/generator shaft being rotatable about a first axis, with the first axis being spaced from the longitudinal axis; and
   a starter mechanism including a first starter gear coupleable to the motor/generator shaft, wherein the first starter gear is rotatable about a second axis, with the second axis being spaced from the longitudinal axis, and the first and second axes being spaced from and substantially parallel to each other, and with the first starter gear being movable along the second axis between a first position engaging the ring gear such that torque is transferred from the motor-generator to the starter mechanism via the motor/generator shaft, and a second position disengaged from the ring gear to rotatably disconnect the starter mechanism from the ring gear, wherein the motor/generator shaft transfers torque through the first starter gear and the ring gear to the crankshaft to start the engine when the first starter gear is in the first position.

2. A powertrain as set forth in claim 1 wherein the motor-generator includes a motor/generator gear attached to a distal end of the motor/generator shaft such that the motor/generator gear and the motor/generator shaft are rotatable in unison about the first axis.

3. A powertrain as set forth in claim 2 wherein the starter mechanism includes a second starter gear coupleable to the motor/generator gear.

4. A powertrain as set forth in claim 3 wherein the second starter gear is movable along the second axis between a third position engaging the motor/generator gear such that torque is transferred from the motor/generator shaft through the motor/generator gear and the second starter gear, and a fourth position disengaged from the motor/generator gear to rotatably disconnect the starter mechanism from the motor-generator.

5. A powertrain as set forth in claim 4 wherein:
   the starter mechanism includes a first shaft having the first starter gear attached thereto such that the first shaft and the first starter gear are rotatable in unison about the second axis, and the first shaft and the first starter gear are movable along the second axis in unison between the first and second positions;
   the starter mechanism includes a second shaft having the second starter gear attached thereto such that the second shaft and the second starter gear are rotatable in unison about the second axis, and the second shaft and the second starter gear are movable along the second axis in unison between the third and fourth positions; and
   the first and second shafts, the first and second starter gears, the motor/generator shaft and the motor/generator gear concurrently rotate with each other when the first starter gear is in the first position and the second starter gear is in the third position to transfer torque from the motor/generator shaft through the first and second starter gears and the ring gear to the crankshaft to start the engine.

6. A powertrain as set forth in claim 5 wherein one of the first and second starter gears moves along the second axis to respective first and third positions before the other one of the first and second starter gears moves along the second axis to the other one of the respective first and third positions.

7. A powertrain as set forth in claim 5 wherein the starter mechanism includes an intermediate shaft coupled to the first and second shafts between the first and second starter gears such that the intermediate shaft rotatably couples the first and second shafts together.

8. A powertrain as set forth in claim 5 wherein the starter mechanism includes a first end and a second end spaced from each other along the second axis, with the first shaft extending outwardly from the first end of the starter mechanism and the second shaft extending outwardly from the second end of the starter mechanism.

9. A powertrain as set forth in claim 1:
further including a crankshaft pulley coupleable to a second distal end of the crankshaft such that the crankshaft pulley and the crankshaft are rotatable in unison about the longitudinal axis;
wherein the motor-generator includes a motor/generator pulley coupleable to the motor/generator shaft adjacent to a first end of the motor-generator, with the motor/generator pulley being rotatable about the first axis;
wherein the motor/generator shaft extends out of a second end of the motor-generator, with the first and second ends of the motor-generator spaced from each other along the first axis; and
further including an endless rotatable device disposed about the crankshaft pulley and the motor/generator pulley to selectively transfer torque between the crankshaft and the motor/generator shaft.

10. A powertrain as set forth in claim 9 wherein the endless rotatable device is a belt.

11. A powertrain as set forth in claim 9 further including a tensioner mechanism engaging the endless rotatable device to apply a first force thereto to tension the endless rotatable device.

12. A powertrain as set forth in claim 1 wherein the motor-generator includes a stator and a rotor spaced from the stator, with the rotor attached to the motor/generator shaft such that the rotor and the motor/generator shaft are rotatable in unison about the first axis relative to the stator.

13. A powertrain for a vehicle, the powertrain comprising:
an engine including a housing and a crankshaft at least partially disposed inside the housing, with the crankshaft being rotatable about a longitudinal axis;
a ring gear disposed outside of the housing and attached to a first distal end of the crankshaft such that the ring gear and the crankshaft are rotatable in unison about the longitudinal axis;
a crankshaft pulley disposed outside of the housing and coupleable to a second distal end of the crankshaft such that the crankshaft pulley and the crankshaft are rotatable in unison about the longitudinal axis;
a motor-generator operable in a first mode to start the engine and a second mode after the engine is started;
wherein the motor-generator includes a motor/generator shaft and a motor/generator pulley coupleable to the motor/generator shaft adjacent to a first end of the motor-generator, with the motor/generator shaft extending out of a second end of the motor-generator, and with the motor/generator pulley and the motor/generator shaft each being rotatable about a first axis, and with the first axis being spaced from the longitudinal axis;
an endless rotatable device disposed about the crankshaft pulley and the motor/generator pulley to selectively rotate the motor/generator pulley when the motor-generator is in the second mode to selectively transfer torque between the crankshaft and the motor/generator shaft; and
a starter mechanism including a first starter gear coupleable to the motor/generator shaft, wherein the first starter gear is rotatable about a second axis when the motor-generator is in the first mode, with the second axis being spaced from the longitudinal axis, and the first and second axes being spaced from and substantially parallel to each other, and with the first starter gear being movable along the second axis between a first position engaging the ring gear such that torque is transferred from the motor/generator shaft through the first starter gear and the ring gear to the crankshaft to start the engine, and a second position disengaged from the ring gear after the engine is started to rotatably disconnect the starter mechanism from the ring gear.

14. A powertrain as set forth in claim 13 wherein the motor-generator includes a motor/generator gear attached to a distal end of the motor/generator shaft such that the motor/generator gear and the motor/generator shaft are rotatable in unison about the first axis.

15. A powertrain as set forth in claim 14 wherein the starter mechanism includes a second starter gear coupleable to the motor/generator gear.

16. A powertrain as set forth in claim 15 wherein the second starter gear is movable along the second axis between a third position engaging the motor/generator gear such that torque is transferred from the motor/generator shaft through the motor/generator gear and the second starter gear, and a fourth position disengaged from the motor/generator gear to rotatably disconnect the starter mechanism from the motor-generator.

17. A powertrain as set forth in claim 16 wherein:
the starter mechanism includes a first shaft having the first starter gear attached thereto such that the first shaft and the first starter gear are rotatable in unison about the second axis, and the first shaft and the first starter gear are movable along the second axis in unison between the first and second positions;
the starter mechanism includes a second shaft having the second starter gear attached thereto such that the second shaft and the second starter gear are rotatable in unison about the second axis, and the second shaft and the second starter gear are movable along the second axis in unison between the third and fourth positions; and
the first and second shafts, the first and second starter gears, the motor/generator shaft and the motor/generator gear concurrently rotate with each other when the first starter gear is in the first position and the second starter gear is in the third position to transfer torque from the motor/generator shaft through the first and second starter gears and the ring gear to the crankshaft to start the engine.

18. A powertrain as set forth in claim 17 wherein one of the first and second starter gears moves along the second axis to respective first and third positions before the other one of the first and second starter gears moves along the second axis to the other one of the respective first and third positions.

19. A powertrain as set forth in claim 17 wherein the starter mechanism includes an intermediate shaft coupled to the first and second shafts between the first and second starter gears such that the intermediate shaft rotatably couples the first and second shafts together.

20. A powertrain as set forth in claim 17 wherein the starter mechanism includes a first end and a second end spaced from each other along the second axis, with the first shaft extending outwardly from the first end of the starter mechanism and the second shaft extending outwardly from the second end of the starter mechanism.

* * * * *